(12) United States Patent
Hui et al.

(10) Patent No.: US 9,240,913 B2
(45) Date of Patent: Jan. 19, 2016

(54) FULL-DUPLEX CAPACITY ALLOCATION FOR OFDM-BASED COMMUNICATION

(75) Inventors: Jonathan W. Hui, Belmont, CA (US); Jean-Philippe Vasseur, Saint Martin d'Uriage (FR); Wei Hong, Berkeley, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 39 days.

(21) Appl. No.: 13/563,564

(22) Filed: Jul. 31, 2012

(65) Prior Publication Data

US 2013/0250866 A1  Sep. 26, 2013

Related U.S. Application Data

(60) Provisional application No. 61/614,975, filed on Mar. 23, 2012.

(51) Int. Cl.
*H04W 72/04* (2009.01)
*H04L 27/00* (2006.01)
(Continued)

(52) U.S. Cl.
CPC .............. *H04L 27/0006* (2013.01); *H04B 3/54* (2013.01); *H04L 5/003* (2013.01); *H04L 5/0007* (2013.01); *H04L 5/0032* (2013.01); *H04L 5/0033* (2013.01); *H04L 5/0037* (2013.01);
(Continued)

(58) Field of Classification Search
CPC .......... H04L 47/10; H04L 47/30; H04L 47/11
See application file for complete search history.

(56) References Cited

U.S. PATENT DOCUMENTS

| 5,504,611 A | * | 4/1996 | Carbone, Jr. ....... H04B 10/0797 379/114.06 |
| 6,072,773 A | | 6/2000 | Fichou et al. |

(Continued)

FOREIGN PATENT DOCUMENTS

| EP | 1388954 A2 | 2/2004 |
| GB | 2443009 A | 4/2008 |

(Continued)

OTHER PUBLICATIONS

Prashanth et al ("OFDM-MAC algorithms and their impact on TCP performance in next generation mobile networks" in 3rd International Conference on Communication Systems Software and Middleware and Workshops, 2008 pp. 133-140 published Jan. 6-10, 2008.*

(Continued)

*Primary Examiner* — Andrew Lai
*Assistant Examiner* — Zhiren Qin
(74) *Attorney, Agent, or Firm* — Parker Ibrahim & Berg LLC; James M. Behmake; Kenneth J. Heywood

(57) ABSTRACT

In one embodiment, device determines a quantity of subcarriers available for data frame transmission and data frame receipt based on information included in an acknowledgement data frame. The device transmits a first data frame over at least one of the subcarriers and includes information associated with one or more additional data frames pending transmission. The device then receives a second data frame, subsequent to transmission of the first data frame, and determines a quantity of subcarriers available for transmission of the one or more additional data frames pending transmission based on the information included in the second data frame.

20 Claims, 4 Drawing Sheets

(51) Int. Cl.
*H04B 3/54* (2006.01)
*H04L 5/00* (2006.01)

(52) U.S. Cl.
CPC .......... *H04L5/0044* (2013.01); *H04L 5/0064* (2013.01); *H04L 5/0094* (2013.01); *H04B 2203/5416* (2013.01); *H04W 72/0453* (2013.01)

(56) References Cited

U.S. PATENT DOCUMENTS

| | | | |
|---|---|---|---|
| 6,118,791 | A | 9/2000 | Fichou et al. |
| 6,192,248 | B1 | 2/2001 | Solondz |
| 6,424,624 | B1 | 7/2002 | Galand et al. |
| 6,934,340 | B1 | 8/2005 | Dollard |
| 7,106,781 | B2 * | 9/2006 | Agee .................. H04B 1/69 370/342 |
| 7,327,697 | B1 | 2/2008 | Friday et al. |
| 7,352,688 | B1 | 4/2008 | Perahia et al. |
| 7,352,718 | B1 | 4/2008 | Perahia et al. |
| 7,359,311 | B1 | 4/2008 | Paranjpe et al. |
| 7,466,981 | B1 | 12/2008 | Abdelhamid et al. |
| 7,586,990 | B2 * | 9/2009 | Subramanian et al. ....... 375/260 |
| 7,593,356 | B1 | 9/2009 | Friday et al. |
| 7,616,604 | B2 | 11/2009 | Abdelhamid et al. |
| 7,724,650 | B2 | 5/2010 | Karam |
| 7,787,897 | B2 | 8/2010 | Banh et al. |
| 7,884,763 | B2 | 2/2011 | Na et al. |
| 7,925,268 | B2 | 4/2011 | Sanders et al. |
| 7,995,525 | B1 | 8/2011 | Perahia et al. |
| 8,031,786 | B2 | 10/2011 | Wang et al. |
| 8,040,831 | B2 | 10/2011 | Kurtz et al. |
| 8,068,552 | B2 | 11/2011 | Wang et al. |
| 8,073,489 | B2 | 12/2011 | Liu et al. |
| 8,082,347 | B2 | 12/2011 | Abdelhamid et al. |
| 8,130,875 | B2 | 3/2012 | Liu et al. |
| 8,134,503 | B2 | 3/2012 | Na et al. |
| 8,145,272 | B2 | 3/2012 | Wang et al. |
| 8,218,677 | B2 | 7/2012 | Jin et al. |
| 8,218,969 | B2 | 7/2012 | Forghieri et al. |
| 8,249,509 | B2 | 8/2012 | Wang et al. |
| 8,320,233 | B2 * | 11/2012 | Razazian ................. H04B 3/54 370/208 |
| 8,374,105 | B1 | 2/2013 | Perahia et al. |
| 8,379,524 | B1 | 2/2013 | Jacobs et al. |
| 8,411,807 | B1 | 4/2013 | Rangarajan et al. |
| 8,416,802 | B2 | 4/2013 | Jin et al. |
| 2006/0294246 | A1 | 12/2006 | Stieglitz et al. |
| 2007/0026868 | A1 | 2/2007 | Schulz et al. |
| 2007/0189330 | A1 * | 8/2007 | Ohmi .................. H04J 3/1682 370/468 |
| 2009/0190535 | A1 * | 7/2009 | Hassan et al. ............. 370/329 |
| 2009/0310692 | A1 | 12/2009 | Kafle et al. |
| 2010/0142540 | A1 | 6/2010 | Matheney et al. |
| 2010/0162329 | A1 | 6/2010 | Ford et al. |
| 2010/0239259 | A1 * | 9/2010 | Forghieri et al. ............ 398/79 |
| 2011/0026630 | A1 | 2/2011 | Stager et al. |
| 2011/0236013 | A1 | 9/2011 | Gazzola et al. |

FOREIGN PATENT DOCUMENTS

| | | |
|---|---|---|
| WO | WO-0239631 A1 | 5/2002 |
| WO | WO-2008144323 A1 | 11/2008 |

OTHER PUBLICATIONS

Prasanth et al ("OFDM-MAC algorithms and their impact on TCP performance in next generation mobile networks" in 3rd International Conference on Communication Systems Software and Middleware and Workshops, 2008, pp. 133-140, published Jan. 6-10, 2008.*

Chen et al, Normalized Queueing Delay: Congestion Control Jointly Utilizing Delay and Marking, Apr. 2009.*

Pettersson, et al., "Invitation to pay Additional Fees, and Where Applicable, Protest Fee", Patent Cooperation Treaty, PCT/US2013/033485, mailed Aug. 20, 2013, 5 pages, European Patent Office, Rijswijk, Netherlands.

Pettersson, et al., "Notification of Transmittal of the International Search Report and The Written Opinion of the International Searching Authority, or the Declaration", Patent Cooperation Treaty, International Application No. PCT/US2013/033504, mailed Aug. 20, 2013, 9 pages, European Patent Office, Rijswijk, Netherlands.

Pettersson, et al., "Invitation to pay Additional Fees, and Where Applicable, Protest Fee", Patent Cooperation Treaty, PCT/US2013/033522, mailed Aug. 20, 2013, 5 pages, European Patent Office, Rijswijk, Netherlands.

Xu, et al., "Hierarchical Opportunistic Scheduling in Multi-Service OFDMA Networks", International Conference on Wireless Communications, Networking and Mobile Computing, Sep. 2007, pp. 2004-2007, Institute of Electrical and Electronics Engineers, Piscataway, New Jersey.

Rummery, et al., "Notification of Transmittal of the International Search Report and the Written Opinion of the International Searching Authority, or the Declaration", Patent Cooperation Treaty, International Application No. PCT/US2013/033485, mailed Nov. 8, 2013, 14 pages, European Patent Office, Rijswijk, The Netherlands.

Rummery, et al., "Notification of Transmittal of the International Search Report and the Written Opinion of the International Searching Authority, or the Declaration", Patent Cooperation Treaty, International Application No. PCT/US2013/033522, mailed Nov. 8, 2013, 15 pages, European Patent Office, Rijswijk, The Netherlands.

Hui, et al., "Techniques for Use in Orthogonal Frequency Division Multiplexing (OFDM) Communication Networks", U.S. Appl. No. 61/614,975, filed Mar. 23, 2012, 48 pages.

Winter; et al., "RPL: IPv6 Routing Protocol for Low-Power and Lossy Networks", Internet Engineering Task Force, Request for Comments 6550, Mar. 2012, 157 pages.

Jain, et al., "Practical, Real-Time, Full Duplex Wireless", Proceeding MobiCom '11 Proceedings of the 17th Annual International Conference on Mobile Computing and Networking pp. 301-312., Sep. 19-23, 2011.

* cited by examiner

FULL-DUPLEX CAPACITY ALLOCATION FOR OFDM-BASED COMMUNICATION

RELATED APPLICATION

The present application claims priority to U.S. Provisional Patent Application Ser. No. 61/614,975, filed Mar. 23, 2012, entitled TECHNIQUES FOR USE IN ORTHOGONAL FREQUENCY DIVISION MULTIPLEXING (OFDM) COMMUNICATION NETWORKS, by Hui et al., the contents of which are hereby incorporated by reference.

TECHNICAL FIELD

The present disclosure relates generally to communication networks, and, more particularly, to communication networks employing orthogonal frequency division multiplexing (OFDM).

BACKGROUND

Low power and Lossy Networks (LLNs), e.g., sensor networks, have a myriad of applications, such as Smart Grid (smart metering), home and building automation, smart cities, etc. Various challenges are presented with LLNs, such as lossy links, low bandwidth, battery operation, low memory and/or processing capability, etc. For instance, LLNs communicate over a physical medium that is strongly affected by environmental conditions that change over time, and often use low-cost and low-power transceiver designs with limited capabilities (e.g., low throughput and limited link margin).

To help provide greater throughput and robustness, Orthogonal Frequency Division Multiplexing (OFDM) utilizes additional bandwidth by allowing transmission of multiple data streams across orthogonal subcarriers simultaneously to increase throughput. Adjusting the number of subcarriers and code-rate can vastly change the effective throughput of the link. In addition, Adaptive Tone Mapping is a process that dynamically selects which subcarriers and coding parameters are used when transmitting a data frame. The goal of Adaptive Tone Mapping is to maximize throughput and minimize channel utilization by only transmitting on usable subcarriers and optimizing the code-rate without sacrificing robustness. Current techniques for selection, allocation, and utilization of subcarriers, however, offer room for improvement.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
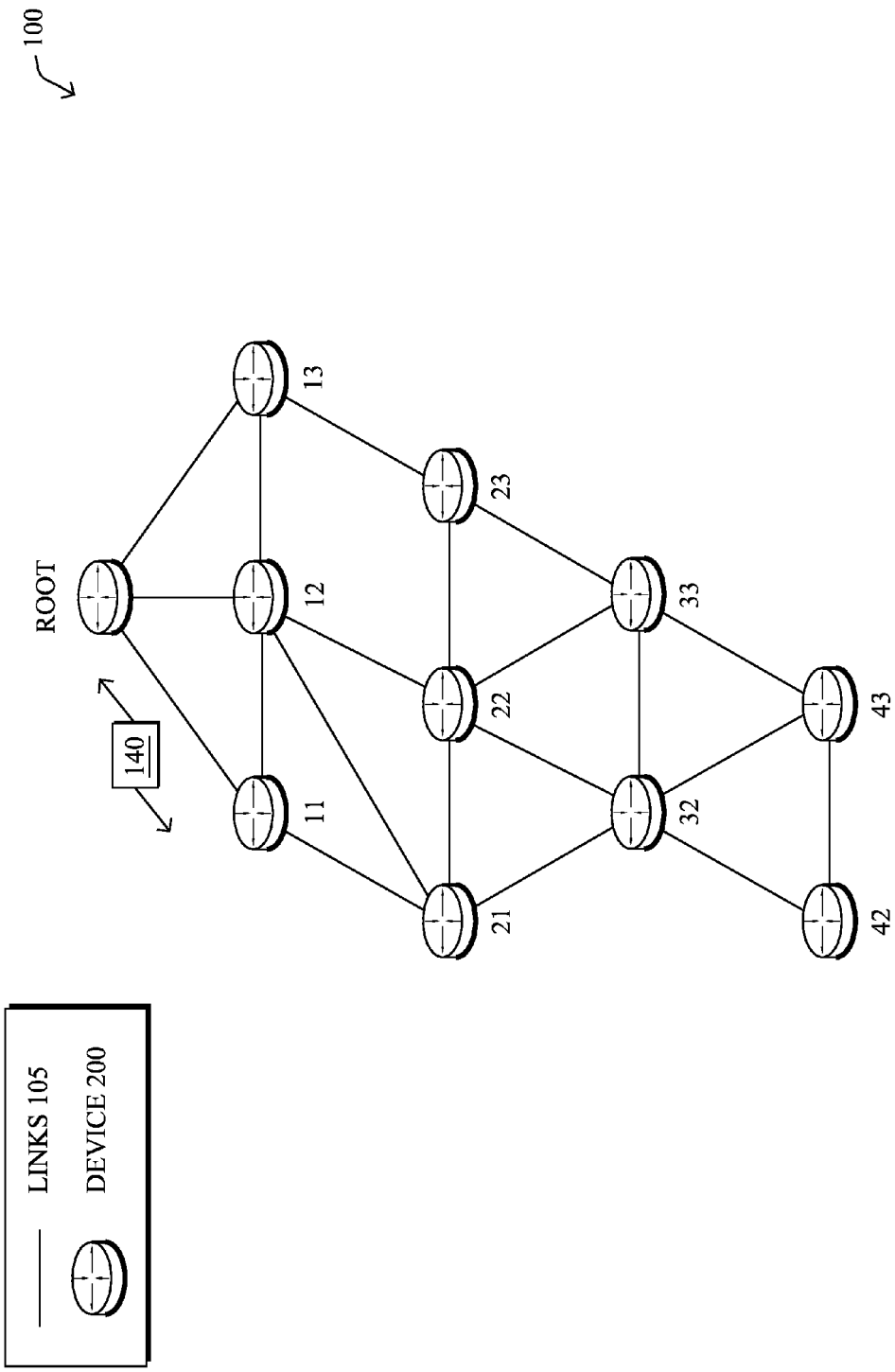
FIG. 1 illustrates an example communication network.

According to one or more embodiments of the disclosure, channel capacity is dynamically allocated for full-duplex communication in an OFDM-based communication network (e.g., an LLN). To achieve this, the techniques herein allow devices to include information about pending data transmissions, including the existence of pending frames, the quantity of pending frames, and the class of service or priority. By including such information in acknowledgments, a transmitter may detect that transmissions are pending in the reverse direction and dynamically relinquish (e.g., allocate) subcarriers to allow full-duplex communication. By recording such information and sending acknowledgments to multiple transmitters, a device may improve the performance of multiple transmitters that may be hidden terminals to each other.

According to other embodiments, a method is provided and includes transmitting a first data frame, with a transmitter, along at least one of a plurality of subcarriers. The first data frame includes information associated with one or more data frames pending transmission by the transmitter. A second data frame is received, with a receiver, subsequent to the first data frame and a quantity of subcarriers available for transmission of the one or more data frames pending transmission is determined, with a processor, based on information included in the second data frame.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, root, 11-13, 21-23, 32-33, and 42-43, and described in FIG. 2 below) interconnected by various methods of communication. For instance, links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is only one example of a computer network 100. Also, those skilled in the art will further understand that while the network is shown in a certain orientation, particularly with a "root" node, the network 100 is merely an example illustration that is not meant to limit the disclosure.

Data packets/data frames 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
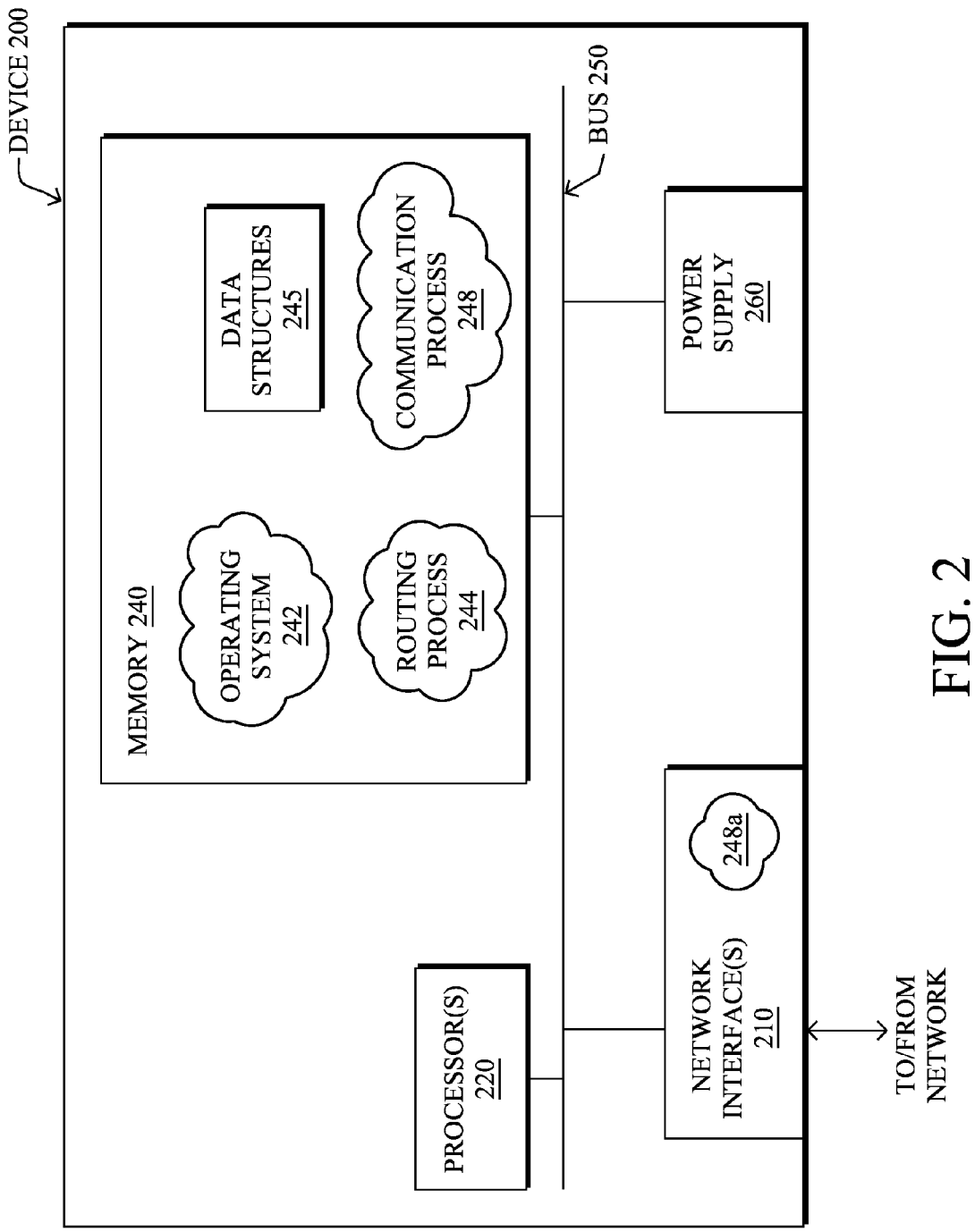
FIG. 2 illustrates an example network device/node.

FIG. 2 is a schematic block diagram of an example node/device 200 that may be used with one or more embodiments described herein, e.g., as any of the nodes shown in FIG. 1 above. Device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. In some exemplary embodiments, network interface(s) 210 may include one or more transmitters configured to transmit data and one or more receivers configured to receive data. Links 105 may include a plurality of subcarriers and data frames/packets may be communicated over the subcarriers between devices 200. Network interfaces 210 may be configured to transmit and/or receive data using a variety of different communication protocols. Note, further, that nodes 200 may have two different types of network interfaces 210, e.g., wireless and wired/physical connections, and that the view herein is merely for illustration. Also, while network interface 210 is shown separately from power supply 260, for PLC the network interface 210 may communicate through power supply 260, or may be an integral component of power supply 260. In some specific configurations the PLC signal may be coupled to the power line feeding into power supply 260.

Memory 240 comprises a plurality of storage locations that are addressable by processor 220 and network interfaces 210 for storing software programs and data structures 245 associated with the embodiments described herein. Note that certain devices may have limited memory or no memory (e.g., no memory for storage other than for programs/processes operating on the device and associated caches). Processor 220 may comprise necessary elements or logic adapted to execute the software programs and manipulate the data structures 245. An operating system 242, portions of which are typically resident in memory 240 and executed by processor 220, functionally organizes device 200 by, inter alia, invoking operations in support of software processes and/or services executing on device 200. These software processes and/or services may comprise an illustrative routing process 244 (for routing devices), and a communication process 248, as described herein. Note that while the communication process 248 is shown in centralized memory 240, alternative embodiments provide for communication process 248 to be specifically operated within the network interfaces 210, such as a component of the MAC or PHY layer of interface 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process 244 (on routing-capable devices) contains computer executable instructions executed by processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), LLN On-demand Ad hoc Distance-vector (LOAD), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example proactive routing protocol specified in an Internet Engineering Task Force (IETF), Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL may generally be described as a distance vector routing protocol that builds a Directed Acyclic Graph (DAG) or Destination Oriented Acyclic Graphs (DODAGs) for use in routing traffic/packets 140 from a root using mechanisms that support both local and global repair, in addition to defining a set of features to bound the control traffic, support repair, etc. One or more RPL instances may be built using a combination of metrics and constraints.

As noted, though, LLNs face a number of communication challenges, such as:

1) LLNs communicate over a physical medium that is strongly affected by environmental conditions that change over time. Some examples include temporal changes in interference (e.g., other wireless networks or electrical appliances), physical obstruction (e.g., doors opening/closing or seasonal changes in foliage density of trees), and propagation characteristics of the physical media (e.g., temperature or humidity changes). The time scales of such temporal changes can range between milliseconds (e.g. transmissions from other transceivers) to months (e.g. seasonal changes of outdoor environment).
2) Low-cost and low-power designs limit the capabilities of the transceiver. In particular, LLN transceivers typically provide low throughput. Furthermore, LLN transceivers typically support limited link margin, making the effects of interference and environmental changes visible to link and network protocols.
3) Shared-media communication networks, such as power-line communication (PLC) networks (a type of communication over power-lines), provide an enabling technology for networking communication and can be used for example in AMI networks, and are also useful within home and buildings. Interestingly, PLC lines share many characteristics with low power radio (wireless) technologies. In particular, though each device in a given PLC network may each be connected to the same physical power-line, a PLC link is very much a multi-hop link, and connectivity is highly unpredictable, thus requiring multi-hop routing when the signal is too weak. For instance, even in a building the average number of hops is between two and three (even larger when having to cross phases), while on an AMI network, on the same power phase line, the number of hops may vary during a day between one and 15-20. Those skilled in the art would recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

To help provide greater throughput and robustness, Orthogonal Frequency Division Multiplexing (OFDM) is being standardized by IEEE 802.15.4g, HomePlug, and IEEE P1901.2. OFDM utilizes additional bandwidth by allowing transmission of multiple data streams across orthogonal subcarriers simultaneously to increase throughput. With optimal erasure codes (e.g., Reed-Solomon), a data frame can be coded across multiple subcarriers to tolerate erasures across different subcarriers and even the complete loss of an individual subcarrier during a packet transmission. In addition, repetition codes may also be applied to provide extremely robust communication, albeit at a very low throughput (known as "ROBO" mode in HomePlug and IEEE P1901.2). Adjusting the number of subcarriers and code-rate can vastly change the effective throughput of the link. For IEEE P1901.2, the effective throughput can range from 2.4 kbps to 34.2 kbps, notably more than an order of magnitude difference.

In addition, Adaptive Tone Mapping is a process that dynamically selects which subcarriers and coding parameters are used when transmitting a data frame. The goal of Adaptive Tone Mapping is to maximize throughput and minimize channel utilization by only transmitting on usable subcarriers and optimizing the code-rate without sacrificing robustness. HomePlug and IEEE P1901.2 currently provide mechanisms to send a Tone Map Request (TMREQ) to a neighboring device. HomePlug and IEEE P1901.2 currently require that all TMRs be sent using all available subcarriers to allow the receiver to evaluate the quality on each subcarrier. The quality may be represented as one or more of signal-to-noise-ratio (SNR), bit-error rate, frame-error rate, etc. Upon receiving a TMREQ, a device evaluates the quality of each subcarrier and includes them in a Tone Map Reply (TMREP). Devices maintain a neighbor table indicating the quality of each subcarrier, allowing them to perform tone mapping for subsequent transmissions to optimize throughput.

Current techniques for selection, allocation, and utilization of subcarriers, however, offer room for improvement. Therefore, various techniques are hereinafter shown and described for use with OFDM-based communication networks.

Illustratively, the techniques described herein may be performed by hardware, software, and/or firmware, such as in accordance with communication process 248, which may contain computer executable instructions executed by processor 220 (or independent processor of interfaces 210) to perform functions relating to the novel techniques described herein. For example, the techniques herein may be treated as extensions to conventional communication protocols, such as the various protocols that utilize OFDM communication (e.g., wireless protocols, PLC protocols, or other shared media protocols), and as such, may be processed by similar components understood in the art that execute those protocols, accordingly.

Dynamic and Temporary Full-Duplex Capacity Allocation

With existing OFDM systems (e.g., HomePlug and P1901.2), devices determine the Tone Map that optimizes robustness and throughput when transmitting the pending data frame to the receiver. In particular, the Tone Map is selected without regard to other pending data frame transmissions or traffic flows by neighboring devices.

The vast majority of flows in a LLN have one end-point at a device outside the LLN and, as a result, flows typically go through the Field Area Router (FAR) (root node, LLN border router or "LBR", etc.). Due to this traffic pattern and limited resource constraints, LLN routing protocols (e.g., Routing Protocol for LLNs (RPL), mentioned above) typically form a DAG-based routing topology rooted at one or more FARs. Using a DAG-based routing topology, devices typically forward packets upwards or downwards along the DAG. As a result, traffic across links within the routing topology often carry traffic in both directions.

Many link technologies in LLNs only provide half-duplex communication, such as single-channel RF transceivers. The current HomePlug and P1901.2 standards also assume half-duplex communication, requiring the preamble and Frame Control Header (FCH) to be sent using all subcarriers. As a result, bi-directional traffic can cause significant amounts of self-interference, where two devices attempt to send data frames to each other and fail to do so. In addition, when performing Adaptive Tone Mapping, devices attempt to choose a Tone Map that optimizes its own transmission without regard to other pending transmissions within the LLN. Devices thus treat all of the subcarriers in aggregate as a single shared communication channel, where only one neighboring device at a time can be transmitting.

Moreover, Orthogonal Frequency Division Multiple Access (OFDMA) is a multi-user version of OFDM, where different users (i.e., devices) are assigned different subsets of the available subcarriers. OFDMA allows different devices transmit simultaneously using different subcarrier subsets and implement full-duplex communication. However, the process of allocating subcarriers to individual devices is typically slow-process compared to the forwarding of data frames and the allocation state persists until the next update. For example, OFDMA systems gather statistics about each device, make adjustments to the subcarrier allocation over time, and communicate the adjustments using some control channel. As a result, OFDMA systems are not well-suited to the bursty nature of LLNs.

The techniques herein enable full-duplex communication between two OFDM devices and dynamically allocate the capacity of each direction at data-path timescales. The dynamic allocation occurs on a per-packet basis, allowing a single transmission to utilize all of the channel capacity (i.e., half-duplex) when full-duplex is not necessary, yet allowing full-duplex if necessary. With full-duplex communication, the techniques herein minimize self-interference between two devices. In particular, the techniques herein allow LLN devices to forward data traffic more efficiently, increasing overall throughput and reducing communication latency.

Specifically, according to one or more embodiments of the disclosure as described in detail below, the techniques herein dynamically allocate channel capacity for full-duplex communication in an OFDM-based communication network (e.g., an LLN). To achieve this, the techniques herein allow devices to include information about pending data transmissions, including the existence of pending frames, the quantity of pending frames, and the class of service or priority. By including such information in acknowledgments, a transmitter may detect that transmissions are pending in the reverse direction and dynamically relinquish (e.g., allocate) subcarriers to allow full-duplex communication. By recording such information and sending acknowledgments to multiple transmitters, a device may improve the performance of multiple transmitters that may be hidden terminals to each other.

Operationally, the techniques herein enable full-duplex communication whenever the two end-points of an OFDM link have data frames enqueued for transmission. Note that full duplex is of great interest especially in environments where real-time operation is a must, since although the bandwidth is shared in terms of subcarriers (which may not be an issue with short frames) that reduces delays. When only one end-point has data frames enqueued for transmission, full-duplex capabilities are not required and the device should be able to take full advantage of the communication channel's capacity between the two devices. However, when both end-points have data frames enqueued for transmission, it may be desirable to allocate channel capacity in each direction to enable full-duplex communication.

This is in contrast to existing approaches, such as OFDMA, that allocate subcarriers and requires all transmissions to remain within their subcarrier allocation. While this approach guarantees a certain communication capacity for each allocation, it does not allow a data transmission to take advantage of any subcarriers that are not currently used by other allocations. Furthermore, while an external control process may adjust the subcarrier allocation over time, this is a relatively slow and independent process relative to the data traffic.

Pending Data-Frame Notification

A first aspect of the techniques herein allows a device to piggyback information about pending data frames on existing data or acknowledgment frames. When sending a data frame from A to B (e.g., any two neighboring nodes of FIG. 1), including such information allows B to determine whether additional data frames are pending in the forward direction. When sending an acknowledgment frame from B to A, including such information allows A to determine whether data frames are pending in the reverse direction.

Figure 3:
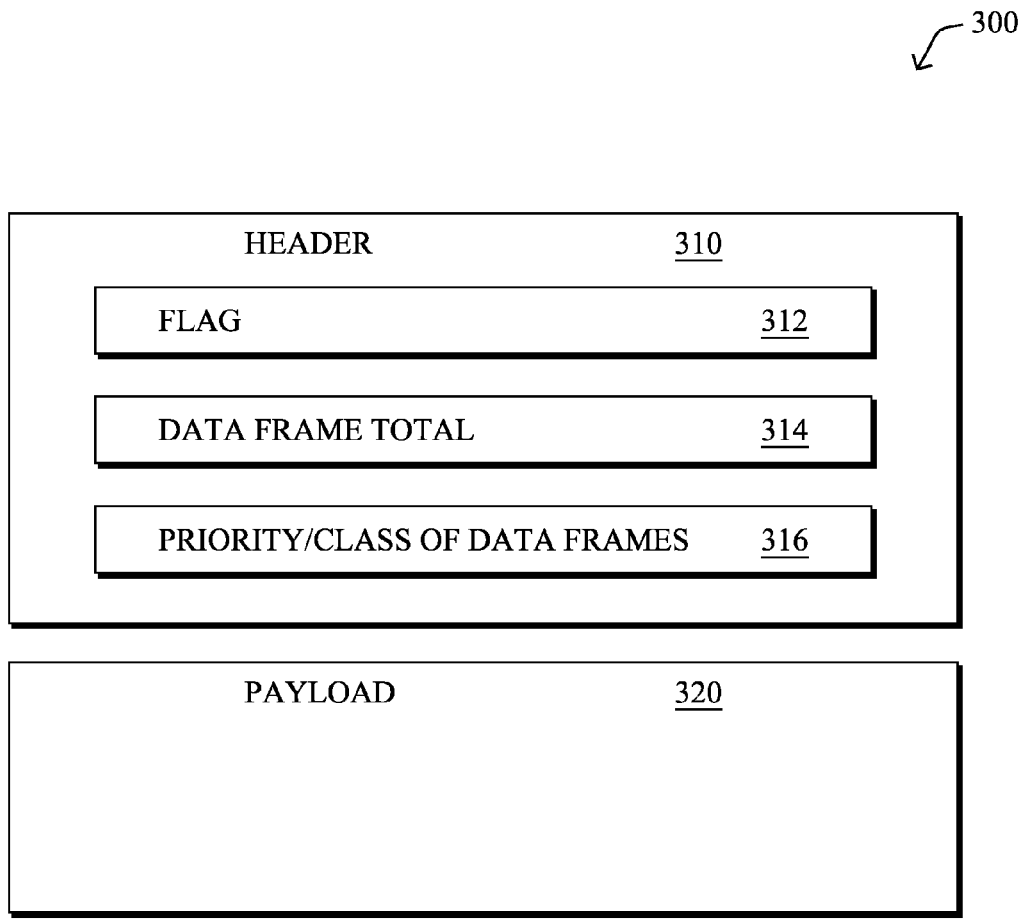
FIG. 3 illustrates an example of a message.

In one embodiment, as shown in the message format 300 of FIG. 3, the techniques herein extend the link frame 300 to include a flag 312 (in header 310) indicating whether or not data frames are pending. This indicates whether there are pending data transmissions at the transmitter destined for the receiver.

In another embodiment, the techniques herein extend the link frame to include the total number or size of data frames that are pending (field 314). This indicates the amount (e.g. in bytes) of pending data transmissions (e.g., including payloads 320) from the transmitter to the receiver.

In yet another embodiment, the link frame is extended to include the priority or traffic class of data frames that are pending (field 316). This indicates what kind of data frames are pending and how those data frames should be treated relative to any other pending transmissions between the two devices (in either direction).

Encoded in IEEE 802.15.4e, the information described above may be included using a newly defined Information Element.

Dynamically Allocating Subcarriers

A second aspect of the techniques herein allows transmitting devices to process the pending data-frame notifications and dynamically adjust the subcarrier allocation, possibly enabling full-duplex communication if necessary. The process occurs as follows.

Figure 4:
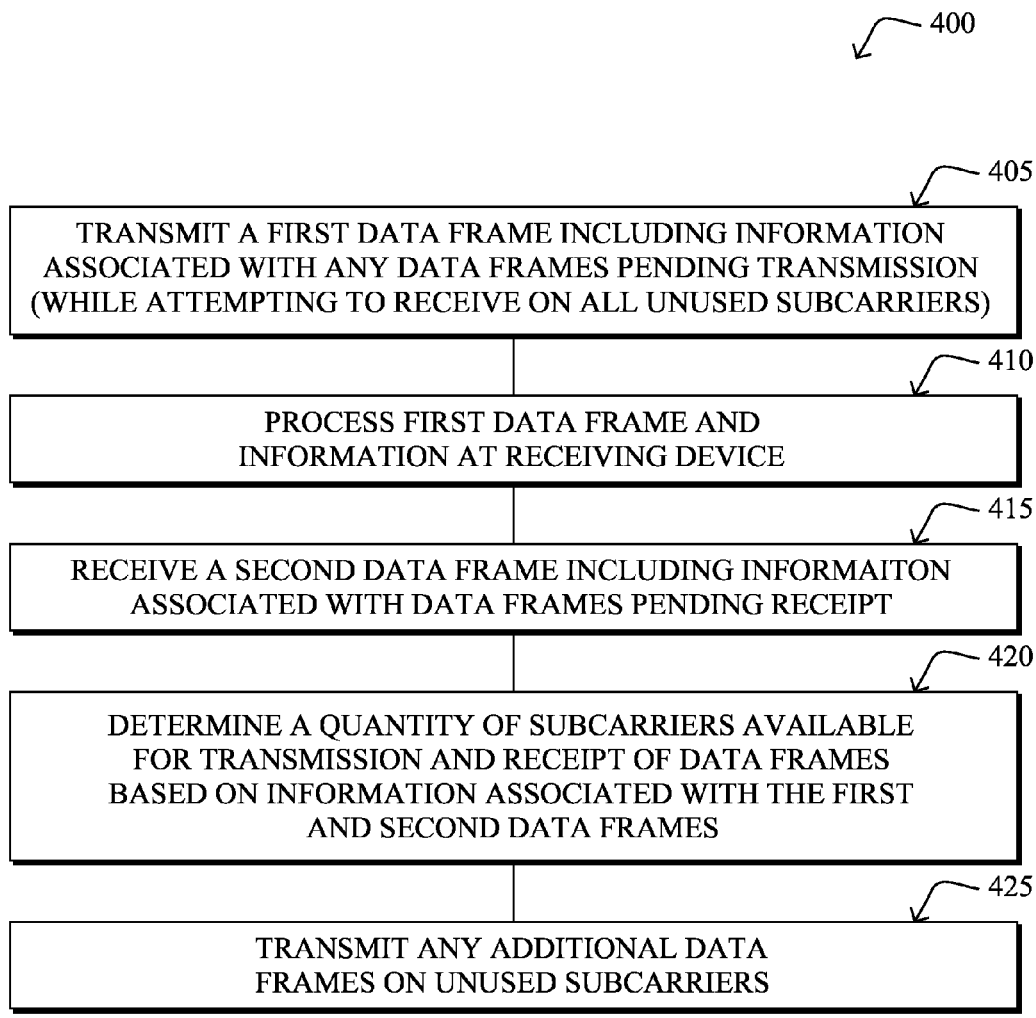
FIG. 4 illustrates an example procedure for dynamically allocating subcarriers.

1) As shown in Step 405 of FIG. 4, when device A has a data frame to transmit to device B (denoted herein as A->B), device A computes the optimal Tone Map utilizing whatever subcarriers may be available, includes information in the data frame regarding any additional data frames that are pending transmission to device B, and transmits the data frame A->B. While transmitting A->B, device A attempts to receive on all unused subcarriers.

2) Upon receipt of the first data frame, device B may process the data frame and its contained information in step 410. In particular, after receiving the PHY header of the data frame, device B then determines whether it has B->A data frames pending. If there are data frames pending, device B may immediately begin transmitting data frames to A on any subcarriers unused by A. However, if only a few subcarriers are available, B may choose to delay transmitting until the transmission from A->B is complete. From the data frame, B determines if additional A->B data frames are pending and may choose to delay transmission further, waiting for additional transmissions from A and allow A to decide which subcarriers to relinquish to B, if any. Once receiving the frame from A is complete, B then includes information about the pending B->A data frames, if any, in the acknowledgment frame sent to A. In one embodiment, the acknowledgment frame may be sent as soon as any current B->A transmission is complete. In another embodiment, the acknowledgment frame may be interleaved with any current B->A transmission.

In yet another embodiment, A immediately receives the acknowledgement frame from B indicating a very critical frame pending, A may interrupt any on-going transmission so as to allow B to send its urgent/critical frame using the maximum set of available sub-carriers. In yet another embodiment a new ACK (acknowledging a non existent frame—used as a new L2 control plane message) is specified to provide this information, should B not have any frame to ACK and an urgent frame to transmit in the B->A direction.

3) As shown in Step 410 of FIG. 4, upon device A receiving the acknowledgment from device B, device A first determines from the received acknowledgment frame if there are B->A data frames pending. While no B->A data frames are pending, device A continues to utilize the optimal Tone Map for any additional data frame transmissions. As shown in Step 415, while there are B->A data frames pending, device A utilizes any information about the B->A data frames contained in the acknowledgment packet (e.g., total bytes that are pending, traffic class, etc.), compares the information to any A->B data frames that are pending, determines a quantity of subcarriers available for transmission and receipt, and removes some number of subcarriers from the Tone Map based on that information. For example, if A->B traffic has higher priority, A may choose to stop using few, if any, subcarriers for its transmissions. However, if B->A traffic has higher priority, A may choose to stop using more subcarriers, leaving them available for transmissions from B.

4) If A has additional A->B data frames to transmit, it does so (in step 425) using the adjusted Tone Map, if any adjustments were made.

5) The process repeats at Step 2.

As described above for the techniques herein, device A dynamically allocates communication capacity in the reverse direction whenever it receives indication that there is pending transmissions for the reverse direction, thus enabling full-duplex communication. When transmitting the data frame, the Tone Map included in the data frame indicates what subcarriers A is using to transmit the frame. But when using the techniques herein, the Tone Map also indicates what subcarriers A is attempting to receive on while it is transmitting. As a result, the Tone Map included in the A->B data frame also serves as a way for A to dynamically allocate what subcarriers B may use in the reverse direction.

In contrast, existing approaches (e.g., OFDMA), rely on a slow adaptive allocation process, where the allocations remain persistent over time by adapt based on observed traffic load. The techniques herein do not maintain persistent allocation state, rather the allocations occur on each packet by utilizing the Tone Map field.

In another embodiment, the acknowledgment frame may include the Tone Map that B would use for optimal transmissions from B->A. A can then use the Tone Map for B->A and determine what subcarriers to relinquish, if any. Ideally, A would relinquish subcarriers that are more robust in the B->A direction than in the A->B direction.

While the description above describes a method to allocate subcarriers between two devices, the techniques herein may also be used to dynamically allocated subcarriers among two devices that are hidden terminals. In particular, consider the case A->B<-C, where A and C are transmitting to B, but A and C are hidden terminals to each other (e.g., nodes 21 and 23 are hidden from each other when transmitting to node 22). When B is receiving frames, from A and C, it can record information about any additional data frames that are pending from A and C. When sending acknowledgments to A and C, B may include different Tone Map information, providing feedback to A and C on what subcarriers to use. As a result, B may dynamically allocate what subcarriers A and C should use within a couple DATA-ACK transactions.

Notably, the techniques herein may face loop interference that occurs when attempting to transmit and receive on the same device. Fortunately, significant efforts have been made to cancel loop interference, using digital cancellation (e.g., 50-70 dB) with antenna or balun cancellation, with minimal added cost to existing transceiver designs, which is enough to allow reception on subcarriers that are not actively currently used for transmission. While such cancellation has generally been developed for achieving full-duplex wireless communication using a single channel, the techniques herein accept its value in only allowing a single device to transmit on a given subcarrier. Even with 50-70 dB attenuation, that may not be enough to properly decode signals that occur near the receiver's rated sensitivity when transmitting on the same subcarrier. For this reason, it may be useful to separate the two transmitters into different subcarrier sets. With current specifications, the techniques herein may need one to two guard tones between contiguous active tones.

The techniques described herein, therefore, provide for dynamic and temporary full-duplex capacity allocation in an OFDM-based communication network. In particular, the techniques provide an agile allocation mechanism that operates on data-plane time scales. Devices can choose to utilize all subcarriers for their own transmissions when full-duplex communication is not needed. But after receiving a single acknowledgment frame, devices may choose to relinquish (e.g., allocate) subcarriers for use in the reverse direction, thus allowing full-duplex communication. This dynamic mechanism is critical to achieve optimal communication throughput and latency in networks that are typically bursty and dynamic. Not having to rely on a separate monitoring and control mechanism to allocate subcarriers provides greater agility in reacting to different traffic loads. By not maintaining any long-term state, the techniques herein also increase robustness.

While there have been shown and described illustrative embodiments of techniques for use with OFDM-based communication networks, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks, regardless of whether they are considered constrained. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    transmitting a first data frame, with a transmitter of a first device, along at least one of a plurality of subcarriers, the first data frame including information associated with one or more additional data frames pending transmission by the transmitter;
    receiving a second data frame, with a receiver of the first device, subsequently to the first data frame, the second data frame including information regarding any pending data frames enqueued to be sent to the receiver by one or more other devices; and
    dynamically selecting, by a processor of the first device, whether to transmit the one or more additional frames in half-duplex mode or in full-duplex mode based on the information included in the received second data frame, wherein the first device selects a subset of the plurality of subcarriers to transmit the additional frames when full-duplex mode is selected and the selected subset of the plurality of subcarriers do not overlap subcarriers used by the one or more other devices for transmitting, wherein the first device selects the entire plurality of subcarriers to transmit the additional frames when half-duplex mode is selected, and wherein the first device selects half-duplex mode in response to the information included in the received second data frame indicating that there are no pending data frames enqueued to be sent to the receiver of the first device by the one or more other devices.

2. The method of claim 1, wherein the information included in the first data frame includes one or more of a quantity, a priority, or a size of the additional data frames pending transmission by the transmitter.

3. The method of claim 1, further comprising determining, with the processor, a quantity of subcarriers available for receipt of any of the pending data frames enqueued to be sent to the receiver by the one or more other devices based on the information included in the first data frame and the information included in the second data frame.

4. The method of claim 3, further comprising adjusting, with the processor, a quantity of subcarriers available for transmission by the first device and a quantity of subcarriers available for receipt by the first device based on the information included in the first data frame and the information included in the second data frame, wherein the quantity of subcarriers for transmission by the first device is selected so as to not overlap subcarriers used to receive the pending data frames enqueued to be sent to the receiver by the one or more other devices.

5. The method of claim 1, wherein the information included in the second data frame includes one or more of a quantity, a priority, or a size of the data frames enqueued to be sent to the receiver by the one or more other devices.

6. The method of claim 1, wherein the second data frame is received after transmission of the first data frame is completed.

7. The method of claim 1, wherein the second data frame is received during the transmission of the first data frame in full-duplex mode.

8. The method of claim 7, wherein the second data frame contains an indication that one or more additional data frames are critical and transmission of the first data frame is interrupted to allow receipt of the pending data frames enqueued to be sent to the receiver by one or more other devices in half-duplex mode.

9. An apparatus, comprising:
    a transmitter configured to transmit one or more data frames over a network using a plurality of subcarriers;
    a receiver configured to receive one or more data frames over the network using the plurality of subcarriers;
    a processor configured to communicate with the transmitter and the receiver;
    a memory configured to communicate with the processor, the memory having instructions stored thereon that, in response to execution by the processor, cause the processor to perform operations comprising:
        transmitting a first data frame over at least one of the subcarriers, the first data frame including information associated with one or more additional data frames pending transmission by the transmitter;
        receiving a second data frame subsequent to transmission of the first data frame, the second data frame including information regarding any pending data frames enqueued to be sent to the receiver by one or more other devices; and
        dynamically selecting whether to transmit the one or more additional frames in half-duplex mode or in full-duplex mode based on the information included in the received second data frame, wherein the processor selects a subset of the plurality of subcarriers to transmit the additional frames when full-duplex mode is selected and the selected subset of the plurality of subcarriers do not overlap subcarriers used by the one or more other devices for transmitting, wherein the apparatus selects the entire plurality of subcarriers to transmit the additional frames when half-duplex mode is selected, and wherein the apparatus selects half-duplex mode in response to the information included in the received second data frame indicating that there are no pending data frames enqueued to be sent to the receiver of the first device by the one or more other devices.

10. The apparatus of claim 9, wherein the information included in the first data frame includes one or more of a quantity, a priority, or a size of the additional data frames pending transmission by the transmitter.

11. The apparatus of claim 9, wherein the processor determines a quantity of subcarriers available for data frame receipt of any of the pending data frames enqueued to be sent to the receiver by one or more other devices based on the information included in the first data frame and the information included in the second data frame.

12. The apparatus of claim 9, wherein the processor adjusts the quantity of subcarriers available for data frame transmission and data frame receipt based on the information included in the first data frame and the information included in the second data frame, wherein the quantity of subcarriers for transmission is selected so as to not overlap subcarriers used to receive the pending data frames enqueued to be sent to the receiver by the one or more other devices.

13. The apparatus of claim 9, wherein the information included in the second data frame includes one or of a quantity, a priority, or a size of data frames enqueued to be sent to the receiver by the one or more other devices.

14. The apparatus of claim 9, wherein the second data frame is received after transmission of the first data frame is completed.

15. The apparatus of claim 9, wherein the second data frame is received during the transmission of the first data frame in full-duplex mode.

16. The apparatus of claim 9, wherein the second data frame contains an indication that one or more additional data frames are critical and transmission of the first data frame is interrupted to allow receipt of the pending data frames enqueued to be sent to the receiver by one or more other devices in half-duplex mode.

17. A tangible non-transitory computer-readable medium having computer executable instructions stored thereon that, when executed by a first device, cause the first device to perform a method comprising:

transmitting a first data frame over at least one of a plurality of subcarriers, the data frame including information associated with one or more additional data frames pending transmission;

receiving a second data frame, subsequent to transmission of the first data frame, the second data frame including information regarding any pending data frames enqueued to be sent to a receiver of the first device by one or more other devices; and dynamically selecting whether to transmit the one or more additional frames in half-duplex mode or in full-duplex mode based on the information included in the received second data frame, wherein the first device selects a subset of the plurality of subcarriers to transmit the additional frames when full-duplex mode is selected and the selected subset of the plurality of subcarriers do not overlap subcarriers used by the one or more other devices for transmitting, wherein the first device selects the entire plurality of subcarriers to transmit the additional frames when half-duplex mode is selected, and wherein the first device selects half-duplex mode in response to the information included in the received second data frame indicating that there are no pending data frames enqueued to be sent to the receiver of the first device by the one or more other devices.

18. The computer-readable medium of claim 17, wherein the method further comprises determining a quantity of subcarriers available for receipt of the pending data frames enqueued to be sent to the receiver by the one or more other devices the based on the information included in the first data frame and the information included in the second data frame.

19. The computer-readable medium of claim 17, wherein the method further comprises adjusting a quantity of sub carriers available for transmission and a quantity of subcarriers available for receipt based on the information included in the first data frame and the information included in the second data frame, wherein the quantity of subcarriers for transmission is selected so as to not overlap subcarriers used to receive the pending data frames enqueued to be sent to the receiver by the one or more other devices.

20. The computer-readable medium of claim 17, wherein the second data frame is received during the transmission of the first data frame, the second data frame contains an indication that one or more additional data frames are critical, and transmission of the first data frame is interrupted to allow receipt of the pending data frames enqueued to be sent to the receiver by one or more other devices in half-duplex mode.

* * * * *